United States Patent [19]

Tsiriggakis

[11] Patent Number: 4,509,388
[45] Date of Patent: Apr. 9, 1985

[54] DIFFERENTIAL GEAR

[75] Inventor: Theodoros Tsiriggakis, Athens, Greece

[73] Assignee: Greek Powder and Cartridge Co., S.A., Hymettus, Greece

[21] Appl. No.: 377,591

[22] Filed: May 12, 1982

[30] Foreign Application Priority Data

May 21, 1981 [DE] Fed. Rep. of Germany ... 8115191[U]

[51] Int. Cl.³ .............................................. F16H 35/04
[52] U.S. Cl. ..................................... 74/650; 74/710.5
[58] Field of Search ...................... 74/650, 710.5, 711

[56] References Cited

U.S. PATENT DOCUMENTS

| 1,282,614 | 10/1918 | Miller | 74/650 |
| 1,897,555 | 2/1933 | Ford | 74/650 |
| 2,651,214 | 9/1953 | Randall | 74/650 |
| 2,967,438 | 1/1961 | Altmann | 74/650 |

FOREIGN PATENT DOCUMENTS

| 529896 | 9/1946 | Canada | 74/650 |
| 741812 | 10/1944 | Fed. Rep. of Germany | |
| 673320 | 1/1930 | France | 74/650 |
| 1192793 | 10/1959 | France | 74/650 |
| 1208442 | 2/1960 | France | 74/650 |
| 245253 | 10/1946 | Switzerland | 74/650 |

OTHER PUBLICATIONS

"Motor-Vorschau" 4/1950, p. 113.
"The Dorr Miller Differentials", The Miller Transmission Co.

Primary Examiner—George H. Krizmanich
Assistant Examiner—Dirk Wright
Attorney, Agent, or Firm—Wenderoth, Lind & Ponack

[57] ABSTRACT

A differential gear includes a power-transmission element, e.g. gear, which distributes rotation from a drive motor to two shafts by way of a gear connection. Two identically designed cam-track disks are opposite the shafts, are mounted coaxially to the power-transmission element, can be turned relative to it. The cam-track disks each have at least one inner and one outer cam track on the surfaces facing each other. The cam tracks have variable heights in axial directions, distributed along the peripheries and are connected by at least one rolling member which rolls on the cam tracks of both cam-track disks. This rolling member is connected to the power-transmission element, in such a way that the axis of rotation of the rolling member is positioned radially to the power-transmission element and, at the same time, the rolling member can be moved crosswise to the rotational axis.

19 Claims, 9 Drawing Figures

DIFFERENTIAL GEAR

BACKGROUND AND SUMMARY OF THE INVENTION

The present invention relates to a new type of differential gear which achieves a speed balancing between two shafts by using the principle of the inclined plane. The two shafts can, for example, be shafts for two driving wheels of an automobile or a tracklaying vehicle. Otherwise, this gear can be used in all cases where conventional differential gears are now used.

In comparison with this conventional differential gears, the differential gear of the invention is considerably more compact in design, is easier to produce and thus will lower costs. Friction inside the differential is reduced, which results in increased durability and a particularly quiet operation. It is therefore the object of the invention to provide a new type of differential gear which can replace conventional differential gears, but which also distinguishes itself by the above-mentioned advantages.

When used in an automobile during a straight drive on a dry road, it operates just like a conventional differential gear, that is power is distributed equally to all wheels. When driving on a curved, dry road, it also behaves like a normal differential gear, that is the outer wheel travels a greater distance than the inner wheel. However, if one wheel does not meet with resistance, e.g. on icy stretches, but the other wheel meets with normal resistance, then a conventional differential gear will fail because one wheel will spin with twice the speed while the other wheel will stand still. The differential gear of the invention is far superior in such a situation because both wheels turn at the same speed, that is the vehicle can drive in spite of poor road conditions. This is possible because axial pressure is exerted by rolling members between two cam-track disks, which transfers the same moment to both wheels.

BRIEF DESCRIPTION OF THE DRAWINGS

The following is a more detailed description of the invention, with reference to the attached drawings. Wherein.

DETAILED DESCRIPTION OF THE INVENTION

In the following, an example with four rolling members per cam track is described. It is, however, quite obvious that more or fewer rolling members per cam track can be provided for if the cam tracks are modified accordingly.

Figure 1:
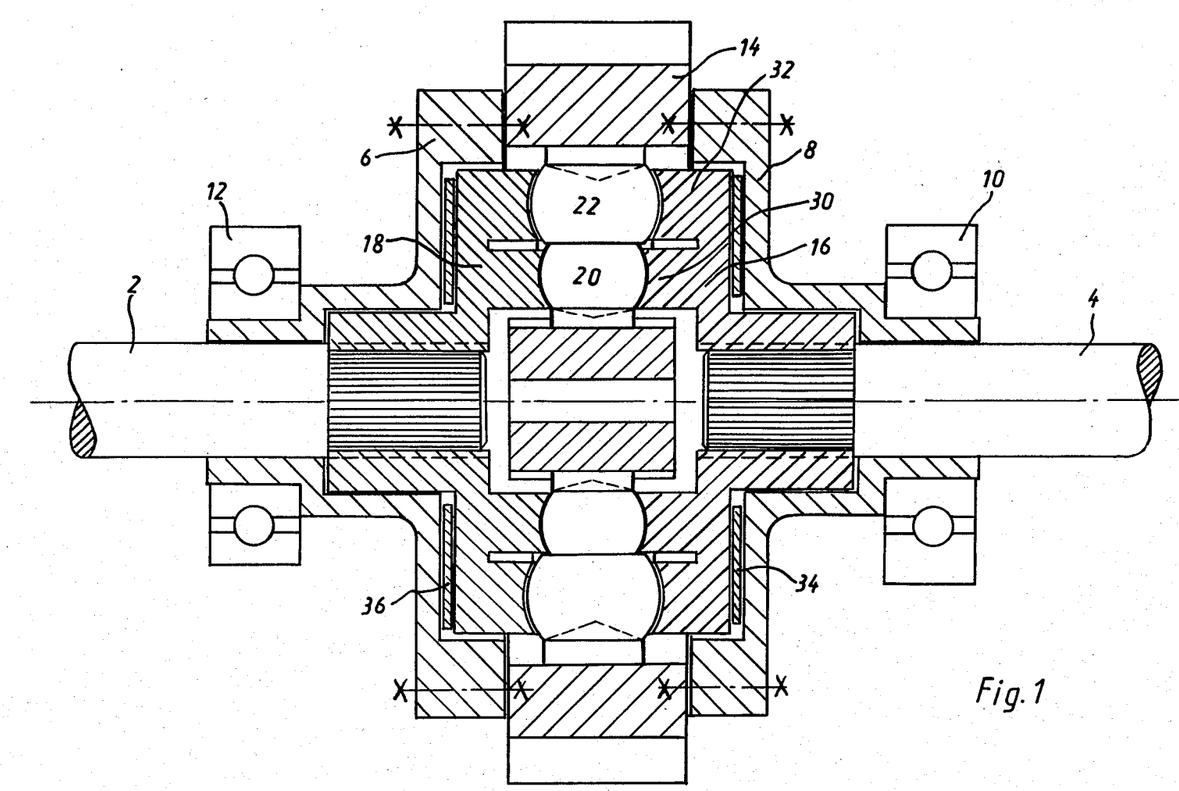
FIG. 1 is a section through a differential gear in accordance with the invention

In FIG. 1 two shafts 2, 4 are to be operated by the differential gear. The rotary motion of these shafts is to be balanced as is the case with a conventional differential gear. Shafts 2, 4 extend through two halves 6, 8 of a differential gear casing. With the aid of sleeve or roller bearings 10, 12, these casing halves, in turn, are embedded inside another casing, not shown. Casing halves 6, 8, in turn, are tightly connected with or bolted to a power-transmission element, e.g. a crown gear or toothed gear 14, whereby the power from a driving motor is transferred to a power-transmission element in a known way in order to start rotation of the entire differential-gear casing.

On the inside ends, both shafts 2, 4 are provided with splined-shaft toothing, which is inserted into correspondingly designed splined-shaft toothing in the center of cam-track disks 16, 18. Other types of connections can also be used. On the fronts, which face each other, these cam-track disks have one inner cam surface or track 30 and one outer cam surface or track 32 each, pointing in the direction of the shaft. They have a concave design and are used to hold rolling members, which will be described in detail later on. With correspondingly shaped rolling members, they can also have different profiles. As shown, these cam tracks are intalled concentrically to the gear shaft.

Figure 2:
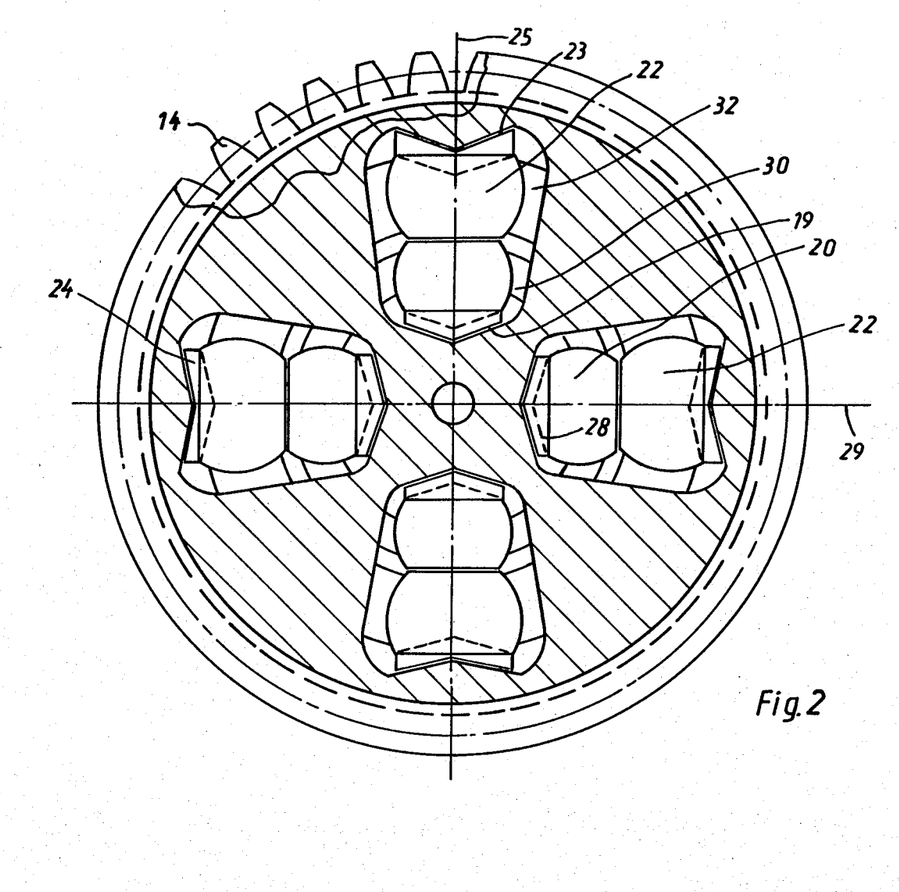
FIG. 2 is a transverse section through the center plane in FIG. 1.
Figure 2A:
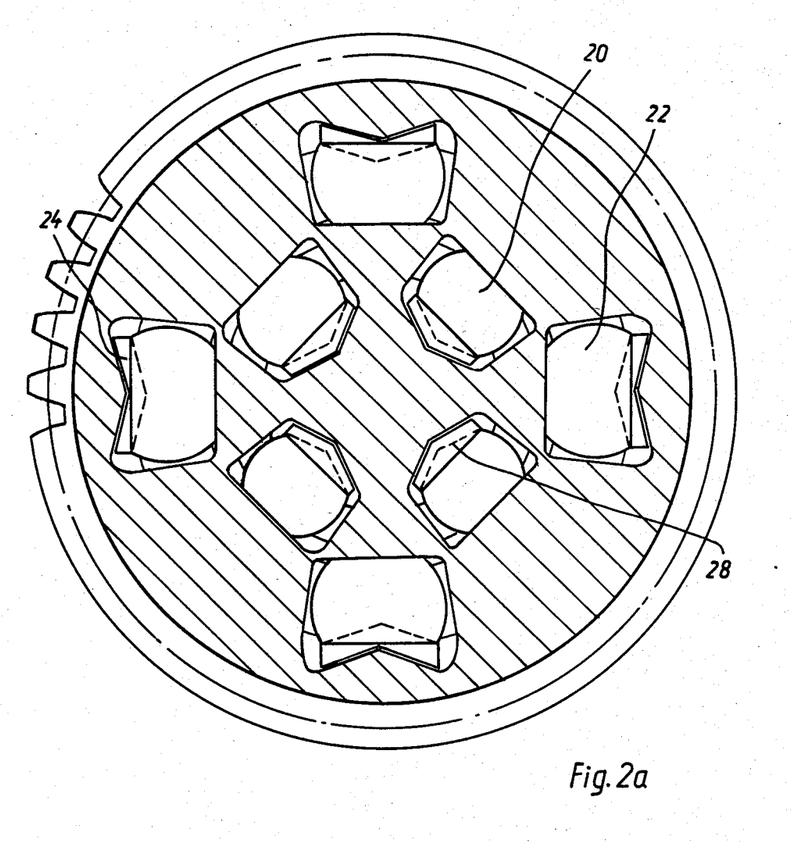
FIG. 2a is a similar section through an alternative design.
Figure 4:
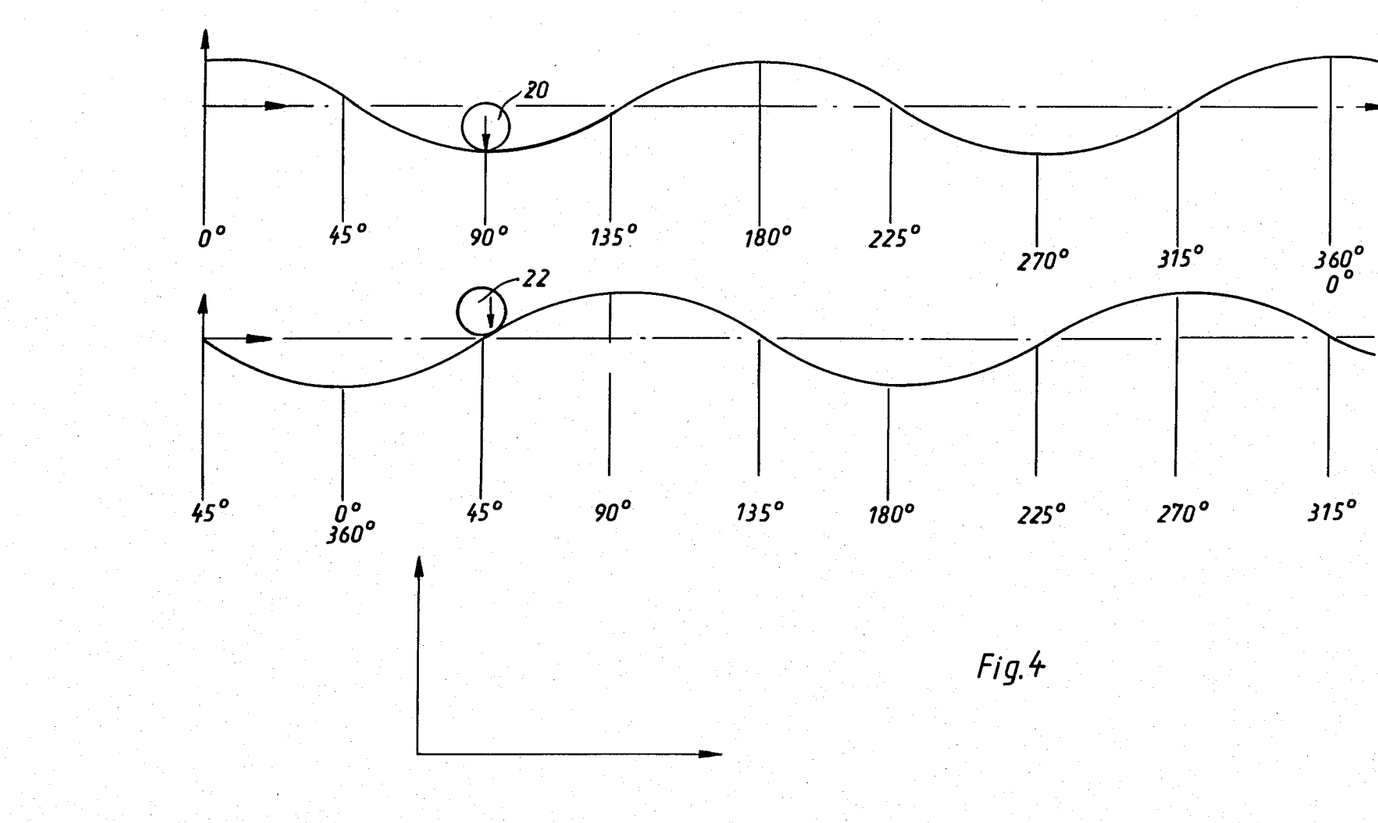
FIG. 4 is a graph of the cam tracks for one of the identically designed cam-track disks of the differential gear.
Figure 5:
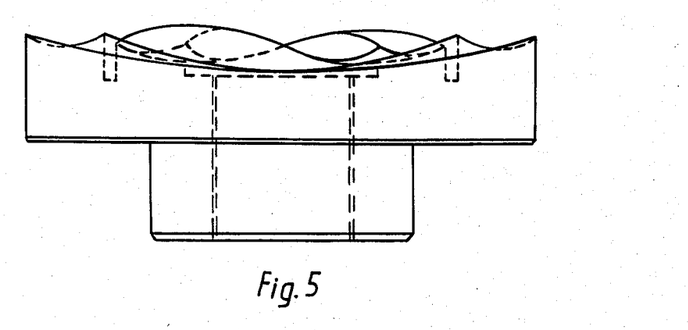
FIG. 5 is a side view of one cam-track disk.
Figure 5A:
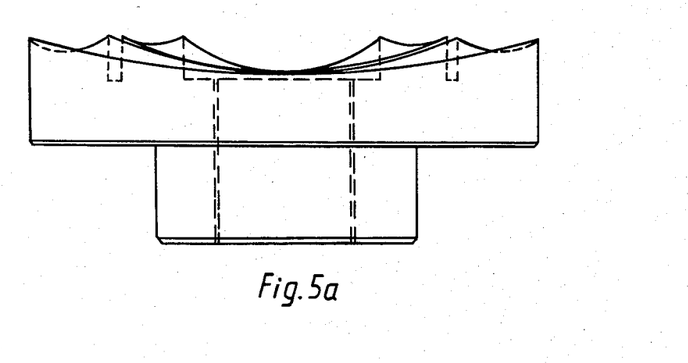
FIG. 5a is a side view of a cam-track disk with cam tracks which are not phase displaced.
Figure 6:
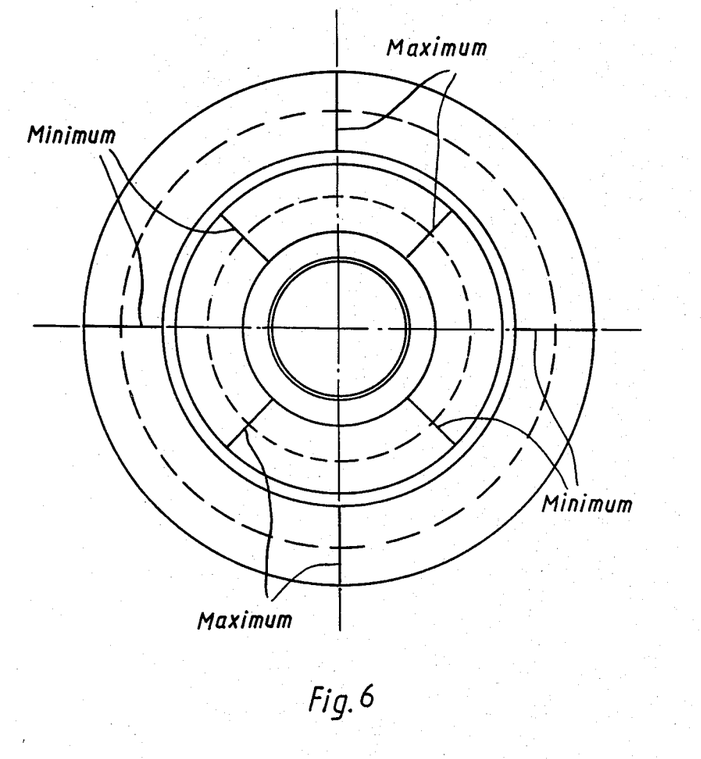
FIG. 6 is a plan view thereof.

FIG. 4 shows one view of each of the cam tracks. As can be seen, each cam track has a variable height in the axial direction, like two successive sine curves, distributed over the periphery of 360° of the cam-track disk. The inner cam track is phase displaced by, for example, 45° compared with the outer cam track. That is when the cam-track disk is rotated around its own shaft i.e. the rotational shaft shown in FIG. 1, a maximum of the inner cam track passes a fixed point in the peripheral direction later, e.g. by 45°, than a maximum of the outer cam track. Alternatively, it would also be possible to arrange the cam tracks such that they are not phase displaced. However, in that case, the coordinated inner and outer rolling members have to be displaced against each other, e.g. by 45°. Such an alternative arrangement is shown in FIGS. 2a and 5a.

Figure 3:
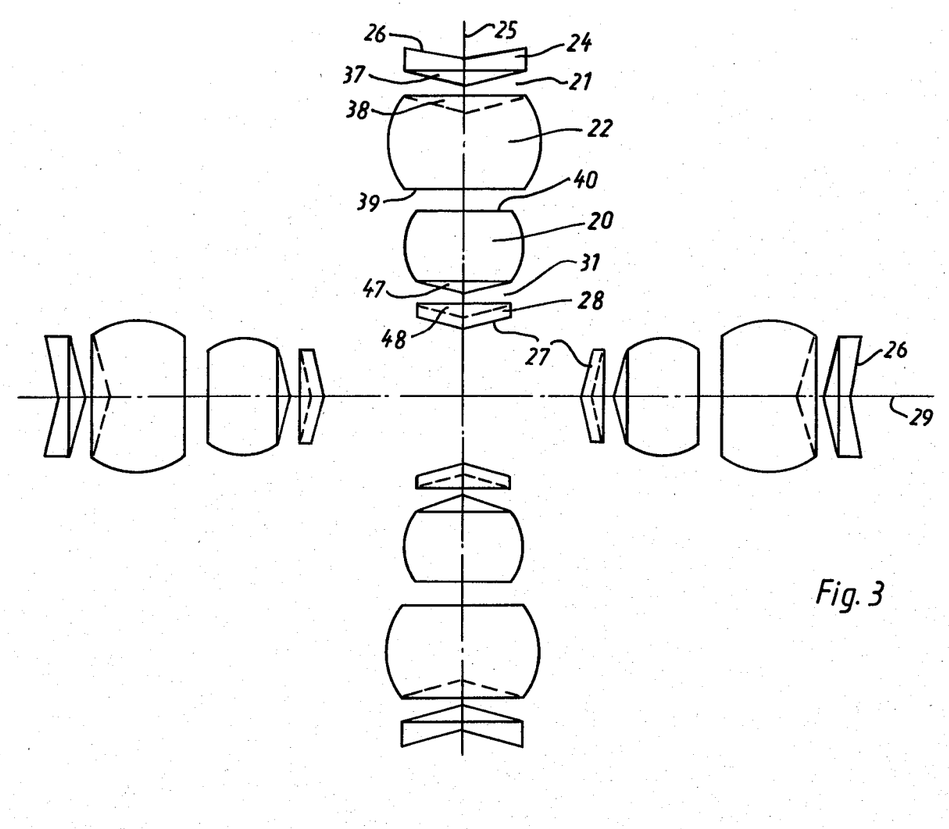
FIG. 3 is an exploded view of the exact design of the rolling members in the gear according to the invention.

As can be seen from FIG. 1, the two cam-track disks 16 and 18 face each other, whereby the space between the inner and the outer cam tracks is filled exactly by small and/or large rolling members 20 and/or 22. In the illustrated arrangement, these rolling members are substantially drum-shaped. Their connecting or confronting adjacent surfaces 39, 40, which if necessary have a friction, reducing separator, are ground planar so that the rolling members can be counter-rotated but also can be moved crosswise to the rotary shaft, i.e. vertical to the plane of FIG. 2. In order to guarantee that, on the one hand, the rolling members can rotate around their own shafts as shown in FIGS. 2 or 3, and on the other hand, as explained, can be moved in directions vertically of the plane of FIG. 2, each of the large rolling members 22 has an inwardly extending conical recess 38 on the side, opposite to the flat surface 39 into which extends a guiding or sliding element 24 which has a corresponding male taper 37. This structure forms a rotational bearing 21. On the radially outer side of guiding element 24 is a slide defined by a V-shaped groove 26 and a correspondingly shaped guide member 23 or gear 14, as can be seen from FIGS. 2 and 3. This V- shaped groove is vertical to the plane of FIG. 2. By positioning the large rolling member 22 in this manner, it can rotate around its own axis 25 or 29 as well as be moved in directions vertical to the plane of FIG. 2 that is in accordance with the alignment of the V-shaped groove 26 of guiding element 24. Guiding element 24 is supported inside the power-transmission element, that is on the gear 14, which is equipped with corresponding V-shaped guide member 23.

The small rolling member 20 is supported in almost exactly the same way in the center of the gear 14, i.e. in the area of the hub thereof, by a comparably shaped guiding and sliding element 28. The small rolling member 20 has a male taper 47 on the radially inner face thereof, which extends into an inner conical recess 48 in sliding element 28 and thus forms rotational bearing 31. Sliding element 28, in turn, has a V-shaped guide member 27 on the radially inner portion thereof which is supported in the center or hub of gear 14 in a correspondingly shaped guide groove 19.

The rotational bearing and slide can also be provided through differently shaped guiding elements 24, 28. The positioning of the inner conical recess and male taper, for example, can be reversed as well as that of the V-shaped groove and/or guide member. Besides, the rotational bearing and slide can be replaced by other structural elements which function the same way.

The above described mounting of rolling members 20 and 22 makes it possible that such members can be moved independently, up and down, relative to the plane of FIG. 2, that is in accordance with the shape of the cam tracks (FIG. 4 shows the contour of these cam tracks). It has to be taken into account that rolling members 22, 20 (in the illustrated arrangement, four, each of which is spaced 90° apart) are prevented from changing this 90° relative spacing by sliding elements 24 and 28. This arrangement of the small and large rolling members 20, 22, which bear respectively upon the inner and outer cam tracks 30, 32, is particularly evident in FIG. 2.

When the power-transmission element, that is gear 14, is put into operation with the aid of the drive, the "cross" arrangement apparent in FIG. 2 and including of four small and/or large rolling members 20, 22 each and the sliding or guiding elements 24 and 28, of necessity also turns. Because the inner and outer cam tracks 30 and/or 32 have different heights in axial directions, distributed peripherally, as can be seen from FIG. 4, and because they are also phase-displaced with respect to each other by 45°, it is possible to obtain a uniform drive for both shafts 2, 4 if they meet the same resistance, as is also the case with conventional differential gears. As soon as the inside wheel of a vehicle travels a shorter distance than the outside wheel because of a curved track, a balancing movement between the two cam-track disks of the differential gear of the invention takes place. The power distribution between shafts 2, 4 takes place with the aid of the axially movable large and/or small rolling members 20, 22 shown in FIG. 2, which bear upon cam tracks 32, 30 as on inclined planes. This principle of a balancing movement between the shafts can also be transferred to all other uses possible. Thus, this gear can generally be used as a pick-off gear, that is the number of revolutions fed into the gear are added or subtracted and passed on to an output shaft. With this balancing movement, due to the phase displacement of the inner and outer cam tracks by 45°, no dead center ever occurs, for which the pressure of all rolling members at the same time and in the axial direction, is applied to a plane extending in the transverse direction, meaning either to the minimum or maximum of the pertinent, sine-shaped cam track. At this point in time (dead center for the first cam track), the other cam track is in such a position, relative to the other rolling member, that the axial pressure is applied to the highest point along the cam track. Accordingly, the axial pressure applied reciprocally between the two cam-track disks 16, 18 by way of rolling members 20, 22 results in a distribution of power and/or the number of revolutions onto both shafts 2, 4.

At the same time and along with the back and forward motion in axial directions, the rolling members 20, 22 carry out a rotating motion, that is they roll off the cam tracks, which leads to a reduction of friction. To further reduce the friction, friction-reducing disks 34, 36 are inserted between casing parts 6, 8 and cam-track disks 16, 18 and have spiral grooves and/or lead-through bushings in axial directions on their frontal areas. These contribute to an even distribution of lubricants to all parts of the differential gear.

Figure 7:
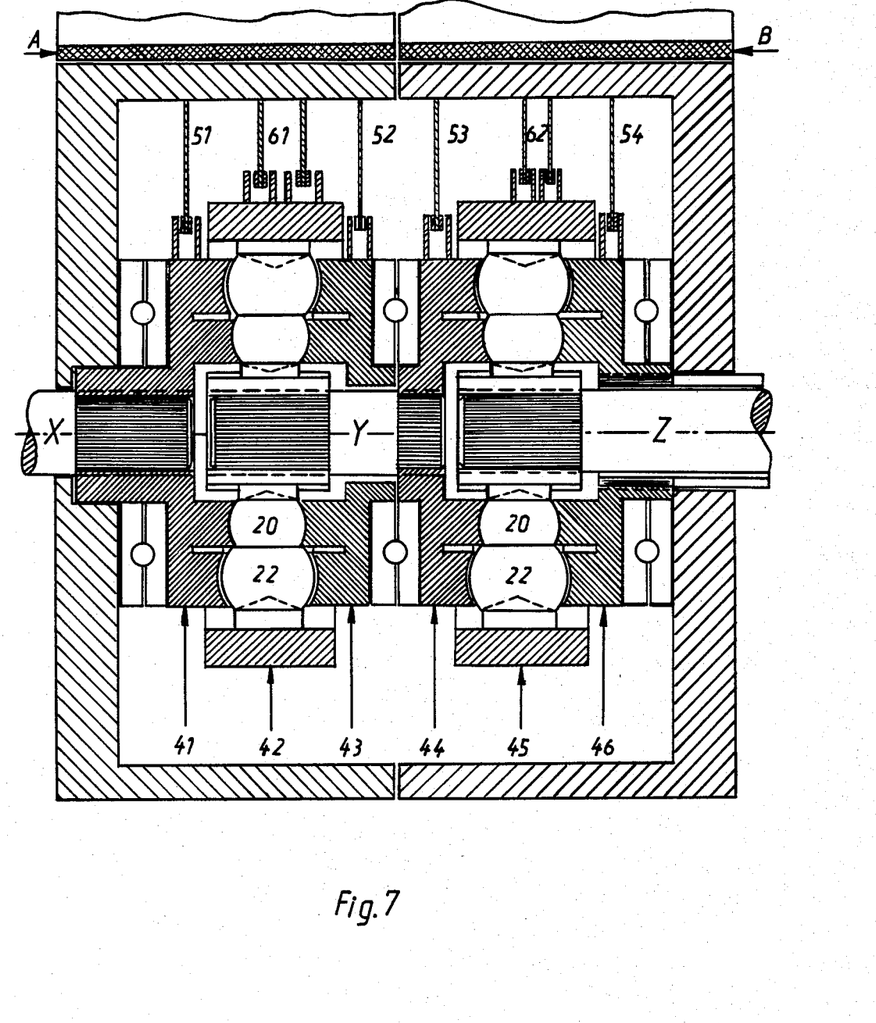
FIG. 7 is a section illustrating the gear of the invention in use, to change an initial speed, e.g. as a gear shift and stepdown gear.

The gear, which has been described so far, can also be used as a stepup or stepdown gear. For example, if the input speed for one shaft is n, then the output speed for the other shaft is n/2. FIG. 7 shows an example of an application of the gear of the invention as a gear shift or stepup gear. A and B show brakes which are suited to secure and/or release the casing halves of the gear as selected. Reference numbers 51 to 54 and/or 61 to 62 show to additional brakes designed to secure selectively the various cam-track disks and/or gears, which correspond to gear 14 in FIGS. 1 or 2.

When brakes A and B and brakes 52 and 54 are applied and speed n is applied to shaft X, then cam-track disk 41, connected to shaft X, imparts through rolling members 20, 22 a motion of revolution to gear 42, which is then taken over by shaft Y. This motion of revolution equals n/2. The same operation is repeated for the following unit, so that shaft Z will have speed n/4 as a result.

Next, assume that the first gear unit (the left one in FIG. 7) operates the same way as in the above described case. Shaft Y again rotates with a speed of n/2. For the second gear unit (the right one in FIG. 7), assume that brakes B and 62 are applied, brakes 53 and 54 are released, and that shaft Z is connected to cam-track disk 46 instead of the center of gear 45. This is similar to the connection of shaft X with cam-track disk 41. In that case, the gear works in such a way that the speed n/2 for shaft Y is transmitted into the same speed, but reverse direction, for shaft Z.

For another case, assume that the brake A is applied, but brakes B, 51 and 61 are released and that in addition, brakes 52, 53, 62 and 54 are applied. In that case, shaft Y again has a speed n/2, which starts with a speed n on shaft X. But because the total gear unit on the right acts like a rigid body, due to the fact that brakes 53, 62 and 54 are applied, shaft Z will have a speed n/2.

Finally, both brakes A and B can be released, while all other brakes 51 to 54 and 61 and 62 are applied. In that case, speed n on shaft X is transmitted without change to shaft Z.

I claim:

1. In a differential gear assembly of the type including two axially aligned shafts and a power transmission element for transmitting rotary motion of a drive motor to said two shafts via gear connections, the improvement comprising:

two cam track disks mounted to rotate with respective said shafts and to rotate coaxially of said power transmission element and relative thereto, said cam track disks having respective axially facing surfaces;

each said cam track disk having on said respective surface thereof at least one circumferentially extending cam track having a contour of axial height varying circumferentially;

at least two circumferentially spaced rolling elements bearing on facing said cam tracks of respective said cam track disks;

each said rolling element being positioned within a recess formed in said power transmission element and having an axis of rotation extending radially with respect thereto;

means for mounting each said rolling element on said power transmission element to enable rotation of said rolling element about said axis thereof; and means for guiding said mounting means for movement axially relative to said power transmission element, thereby enabling movement of said rolling element axially of said power transmission element upon relative rotation of said power transmission element with respect to said cam track disk.

2. The improvement claimed in claim 1, wherein said facing surfaces of said two cam track disks have thereon a pair of confronting radially inner said cam tracks and a pair of confronting radially outer said cam tracks, and comprising first said rolling elements bearing on said inner cam tracks and second said rolling elements bearing on said outer cam tracks.

3. The improvement claimed in claim 2, wherein respective of said first rolling elements are aligned radially inwardly of respective said second rolling elements, with said axes of rotation thereof being colinear.

4. The improvement claimed in claim 3, wherein said radially aligned first and second rolling elements have confronting planar surfaces.

5. The improvement claimed in claim 4, further comprising a friction reducing separator between respective said confronting planar surfaces.

6. The improvement claimed in claim 2, wherein said axes of rotation of said first rolling elements are circumferentially offset from said axes of rotation of said second rolling elements.

7. The improvement claimed in claim 6, wherein each said rolling element includes one radial end defined by a planar surface confronting a complementary surface of said power transmission element.

8. The improvement claimed in claim 7, further comprising a friction reducing separator between each said confronting planar and complementary surfaces.

9. The improvement claimed in claim 1, wherein said mounting means for each said rolling element comprises a guiding element, and respective surfaces of said rolling element and said guiding element enabling rotation of said rolling element about said axis thereof relative to said guiding element.

10. The improvement claimed in claim 9, wherein said respective surfaces comprise a conical recess in said rolling element and a conical taper extending from said guiding element into said recess.

11. The improvement claimed in claim 9, wherein said respective surfaces comprise a conical recess in said guiding element and a conical taper extending from said rolling element into said recess.

12. The improvement claimed in claim 9, wherein said guiding means comprises respective axially extending surfaces of said guiding element and said power transmission element.

13. The improvement claimed in claim 12, wherein said respective axially extending surfaces define a V-shaped groove in said guiding element and a V-shaped projection extending from said power transmission element into said groove.

14. The improvement claimed in claim 12, wherein said respective axially extending surfaces define a V-shaped groove in said power transmission element and a V-shaped projection extending from said guiding element into said groove.

15. The improvement claimed in claim 1, wherein each said roller element is substantially barrel shaped, and said cam tracks have corresponding shapes.

16. The improvement claimed in claim 1, wherein each said cam track has a circumferential path substantially corresponding to two consecutive sine waves.

17. The improvement claimed in claim 16, wherein each said cam track disk has inner and outer said cam tracks phase displaced 45° with respect to each other.

18. The improvement claimed in claim 16, wherein each said cam track disk has inner and outer cam tracks in phase with respect to each other, said rolling elements bearing on confronting said inner cam tracks being out of phase by 45° with respect to said rolling elements bearing on confronting said outer cam tracks.

19. The improvement claimed in claim 1, wherein said rolling elements are spaced circumferentially at equal intervals.

* * * * *